(12) United States Patent
Mardh et al.

(10) Patent No.: US 10,464,603 B2
(45) Date of Patent: Nov. 5, 2019

(54) STEER TORQUE MANAGER FOR AN ADVANCED DRIVER ASSISTANCE SYSTEM OF A ROAD VEHICLE

(71) Applicant: VOLVO CAR CORPORATION, Gothenburg (SE)

(72) Inventors: Lars Johannesson Mardh, Torslanda (SE); Malin Haglund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 171 days.

(21) Appl. No.: 15/888,717

(22) Filed: Feb. 5, 2018

(65) Prior Publication Data
US 2018/0229769 A1   Aug. 16, 2018

(30) Foreign Application Priority Data

Feb. 10, 2017 (EP) .................................... 17155512

(51) Int. Cl.
*B62D 15/02* (2006.01)
*B62D 5/04* (2006.01)
(Continued)

(52) U.S. Cl.
CPC ......... *B62D 15/025* (2013.01); *B62D 5/0463* (2013.01); *B62D 6/008* (2013.01);
(Continued)

(58) Field of Classification Search
CPC ....... B60L 1/00; B60W 50/04; B60W 40/072; B60W 40/08; B60W 30/045; B60W 30/02;
(Continued)

(56) References Cited

U.S. PATENT DOCUMENTS

| 5,270,708 A | 12/1993 | Kamishima |
| 5,765,116 A | 6/1998 | Wilson-Jones et al. |

(Continued)

FOREIGN PATENT DOCUMENTS

| EP | 1 291 227 A2 | 3/2003 |
| EP | 2 159 777 A2 | 3/2010 |
| EP | 3 106 367 A1 | 12/2016 |

OTHER PUBLICATIONS

Extended European Search Report dated Jul. 6, 2017, Application No. 17155512.1-1755, Applicant Volvo Car Corporation, 5 Pages.
(Continued)

*Primary Examiner* — Behrang Badii
(74) *Attorney, Agent, or Firm* — Brooks Kushman P.C.

(57) ABSTRACT

A steer torque manager for an advanced driver assistance system of a road vehicle and a method therefor. A driver-in-the-loop functionality determines when to hand over control to a driver. A wheel angle controller uses an advanced driver assistance system wheel angle request to produce an overlay torque request to be added to a torque request from an electrical power assisted steering. The steer torque manager controls the driver-in-the-loop functionality based on amplitude and frequency content of a torsion bar torque related signal which is filtered to attenuate an amplitude thereof at frequencies up to 2 Hz. The overlay torque request to be provided by the wheel angle controller is modulated based on a measure of driver activity derived from the filtered torsion bar torque related signal, where more recent values are weighted higher than older values, using a time window of 0.5-3 seconds.

20 Claims, 5 Drawing Sheets

(51) Int. Cl.
  *B62D 6/00* (2006.01)
  *B62D 6/10* (2006.01)
  *B62D 1/28* (2006.01)
  *B60L 1/00* (2006.01)
  *B60W 50/04* (2006.01)
  *B60W 40/08* (2012.01)

(52) U.S. Cl.
  CPC *B62D 6/10* (2013.01); *B60L 1/00* (2013.01); *B60W 40/08* (2013.01); *B60W 50/04* (2013.01); *B62D 1/286* (2013.01); *B62D 5/04* (2013.01); *B62D 6/00* (2013.01)

(58) Field of Classification Search
  CPC ...... B60W 30/12; B60W 10/18; B60W 10/20; B62D 6/003; B62D 5/0463; B62D 1/286; B62D 5/0409; B62D 6/10; B62D 15/021; B62D 15/025; B62D 5/0457; B62D 6/00; B62D 5/04; B62D 6/008; B62D 5/0472; B62D 5/001; B62D 5/0421; B62D 5/0481; B62D 6/001; B62D 15/0245; B62D 15/0215; B60T 8/1708; B60T 8/1755; B60T 8/17557; G08G 1/16; G01D 5/145; G01L 5/221; G01L 3/104; G01L 3/109
  See application file for complete search history.

(56) References Cited

U.S. PATENT DOCUMENTS

| | | | |
|---|---|---|---|
| 5,925,082 | A | 7/1999 | Shimizu et al. |
| 6,053,270 | A | 4/2000 | Nishikawa et al. |
| 6,178,365 | B1 | 1/2001 | Kawagoe et al. |
| 6,487,501 | B1 | 11/2002 | Jeon |
| 6,879,896 | B2 | 4/2005 | Martens |
| 8,118,126 | B2 | 2/2012 | Rattapon et al. |
| 8,121,760 | B2 | 2/2012 | Ghoneim et al. |
| 8,392,064 | B2 | 3/2013 | Thrun et al. |
| 9,002,579 | B2 | 4/2015 | Kataoka |
| 9,156,464 | B2 | 10/2015 | Schuberth et al. |
| 9,428,219 | B2 | 8/2016 | Flehmig et al. |
| 9,499,202 | B2 | 11/2016 | Lewis et al. |
| 9,586,619 | B1 | 3/2017 | Akatsuka et al. |
| 9,731,755 | B1 | 8/2017 | Moshchuk et al. |
| 2001/0020902 | A1 | 9/2001 | Tamura |
| 2002/0194016 | A1 | 12/2002 | Moribe et al. |
| 2003/0045982 | A1 | 3/2003 | Kondo et al. |
| 2004/0030670 | A1 | 2/2004 | Barton |
| 2004/0262063 | A1 | 12/2004 | Kaufmann et al. |
| 2005/0273262 | A1 | 12/2005 | Kawakami et al. |
| 2006/0200289 | A1 | 9/2006 | Chino et al. |
| 2007/0027583 | A1 | 2/2007 | Tamir et al. |
| 2007/0198145 | A1 | 8/2007 | Norris et al. |
| 2008/0047775 | A1 | 2/2008 | Yamazaki |
| 2009/0319060 | A1 | 12/2009 | Wojsznis et al. |
| 2010/0152952 | A1* | 6/2010 | Lee .................. B62D 1/286 701/31.4 |
| 2011/0055577 | A1 | 3/2011 | Candelore et al. |
| 2012/0109465 | A1* | 5/2012 | Svensson ............. B60T 8/1708 701/42 |
| 2012/0109466 | A1* | 5/2012 | Svensson ............. B62D 5/0463 701/42 |
| 2012/0166032 | A1 | 6/2012 | Lee et al. |
| 2013/0096778 | A1 | 4/2013 | Goto et al. |
| 2015/0012182 | A1 | 1/2015 | Flehmig et al. |
| 2015/0183460 | A1 | 7/2015 | Oyama |
| 2015/0344029 | A1 | 12/2015 | Silvlin |
| 2016/0207537 | A1 | 7/2016 | Urano et al. |
| 2016/0229447 | A1 | 8/2016 | Wada et al. |
| 2016/0272197 | A1* | 9/2016 | Hulten ................. B62D 6/003 |
| 2016/0362102 | A1 | 12/2016 | Honda et al. |
| 2016/0375911 | A1 | 12/2016 | Coelingh et al. |
| 2017/0088174 | A1 | 3/2017 | Inoue et al. |
| 2017/0106903 | A1 | 4/2017 | Moretti et al. |
| 2017/0225686 | A1 | 8/2017 | Takaso et al. |
| 2017/0232997 | A1 | 8/2017 | Tsubaki et al. |
| 2017/0282972 | A1 | 10/2017 | Moretti |
| 2017/0291638 | A1 | 10/2017 | Gupta |
| 2017/0297621 | A1 | 10/2017 | Bunderson et al. |
| 2017/0355396 | A1 | 12/2017 | Varunjikar et al. |
| 2018/0157221 | A1 | 6/2018 | Anderson |
| 2018/0265120 | A1 | 9/2018 | Mardh et al. |
| 2018/0265123 | A1 | 9/2018 | Mardh et al. |
| 2018/0265128 | A1 | 9/2018 | Mardh et al. |
| 2019/0241189 | A1* | 8/2019 | Odate .................. B60L 1/00 |

OTHER PUBLICATIONS

Mardh, Lars Johannesson, United States Patent and Trademark Office, Non-Final Office Action for U.S. Appl. No. 15/888,879, dated Aug. 28, 2019.

European Patent Office, Extended European Search Report for European Application No. 17161563.6-1755, dated Sep. 19, 2017, 5 Pages.

European Patent Office, Extended European Search Report for European Application No. 17161786.3-1755, dated Sep. 19, 2017, 9 pages.

European Patent Office, Extended European Search Report for European Application No. 17161795.4-1755, dated Sep. 20, 2017, 9 Pages.

U.S. Patent and Trademark Office, Non-Final Office Action for U.S. Appl. No. 15/918,139, dated Jul. 30, 2019, 18 pages.

* cited by examiner

STEER TORQUE MANAGER FOR AN ADVANCED DRIVER ASSISTANCE SYSTEM OF A ROAD VEHICLE

CROSS-REFERENCE TO RELATED APPLICATIONS

This application claims foreign priority benefits under 35 U.S.C. § 119(a)-(d) to European patent application number EP 17155512.1, filed Feb. 10, 2017, which is incorporated by reference in its entirety.

TECHNICAL FIELD

The present application relates to a steer torque manager for an advanced driver assistance system of a road vehicle having an electrical power assisted steering and a method in such a steer torque manager.

BACKGROUND

It is known to use power steering in road vehicles, e.g., electrical power assisted steering, commonly abbreviated as EPAS, in a road vehicle such as a car, lorry, bus or truck, wherein an electric motor assists a driver of the road vehicle by adding an assistive torque to e.g., a steering column or steering rack of the road vehicle.

It is further known to use advanced driver assistance systems, commonly abbreviated as ADAS, such as Lane Keeping Aid systems, commonly abbreviated as LKA systems, in order to help a road vehicle driver maintain the road vehicle in a desired lane. For LKA or lane centering systems where an EPAS is used, a steering wheel torque overlay, i.e., additional steering wheel torque on top of what would have been obtained by the base assist of the EPAS, is used for lateral position control.

However, the need for more advanced autonomous steering functions has put new requirements on current steering safety concepts. One example of such is commonly called Pilot Assist, commonly abbreviated as PA, which helps a driver to drive the vehicle within the road lane whilst at the same time maintaining a preselected time interval to a preceding vehicle.

Current safety mechanisms for driver assistance functions, such as PA functions, commonly rely on a driver to always hold his or her hands on the steering wheel. By holding the steering wheel, the driver will influence a wheel angle controller with a torque disturbance. When the driver is resting his or her hands on the steering wheel the torque disturbance depends on the biometrics of the driver as well as the numerous different ways different drivers might hold the steering wheel.

A Steer Torque Manager, commonly abbreviated as STM, is a component that includes a Driver In the Loop functionality, commonly abbreviated as DIL functionality, and a wheel angle controller. The DIL functionality usually relies on a torsion bar torque sensor to decide when and how to hand over control to the driver from the Pilot Assist- or Lane Keeping Aid-functionality and when the driver is to be treated as a disturbance that needs to be suppressed by the wheel angle controller. The DIL-functionality hands over control to the driver by limiting the torque output of the wheel angle controller, e.g., by scaling the output or by decreasing the maximum and minimum allowed overlay torque. The STM is commonly located in an EPAS supplier node, herein referred to as Power Steering Control Module, commonly abbreviated as PSCM.

Since a driver is required to keep his or her hands on the steering wheel the overall comfort and customer value of the PA functionality is largely decided by the DIL-functionality, which needs to handle two partly contradictory requirements. Firstly, the DIL-functionality and the wheel angle controller should be able to track a wheel angle request from the PA path while suppressing the torque disturbance from a driver that rests his or her hands on the steering wheel. Secondly, when the driver desires to take control of the vehicle, the DIL-functionality should comfortably hand over control to the driver, thereby assuring that the driver never experiences high torque in the steering wheel.

These two requirements are contradictory because the first requirement relies on being able to suppress large levels of steering wheel torque disturbances, while the second requirement means that the driver should never experience a large counteracting torque from the wheel angle controller.

When a driver rests his or her hands on the steering wheel, whilst shoulders and arms are rested, this will normally result in steering wheel torques in the magnitude of 1-2 Nm, which normally will activate current DIL-functionality, causing a hand-over of control to the driver by decreasing available overlay torque.

Some current DIL-functionalities are tuned to suppress the relatively large levels of steering wheel torque disturbances, such as e.g., occur in one hand driving with a 5 o'clock or 7 o'clock grip of the steering wheel, e.g., as described above. As a result, many drivers experience that such current PA-functionality has an uncomfortably stiff or strong steering wheel feel.

In order to provide a vehicle with a comfortable DIL-functionality, where a driver will never experience high torque from the wheel angle controller, some vehicle manufacturers have chosen to sacrifice the first requirement, which however, as discussed above, comes at the cost of risking an unintentional decrease of available overlay torque and an associated hand-over of control to the driver.

Thus, there is a need for improved solutions which are able to simultaneously handle both of the above requirements whilst facilitating fulfillment of high Automotive Safety Integrity requirements.

SUMMARY

Embodiments herein aim to provide an improved steer torque manager for an advanced driver assistance system of a road vehicle.

This is provided through a steer torque manager for an advanced driver assistance system of a road vehicle having an electrical power assisted steering, the steer torque manager comprising a driver in the loop functionality for determining when and how to hand over control from an advanced driver assistance system to a driver, a wheel angle controller for providing, from an advanced driver assistance system wheel angle request, an overlay torque request to be added to a torque request from the electrical power assisted steering, and the steer torque manager further being arranged to receive a steering wheel torsion bar torque related signal, where the steer torque manager further is arranged to control the driver in the loop functionality based on amplitude and frequency content of the torsion bar torque related signal through being arranged to filter the torsion bar torque related signal to attenuate an amplitude thereof at frequencies up to 2 Hz and to modulate the overlay torque request to be provided by the wheel angle controller based on a measure of driver activity derived from the filtered torsion bar torque related signal, where more recent values are weighted higher than older values, using a time window of 0.5-3 seconds.

The provision of modulating the overlay torque request as above provides for allowing a driver of an associated road vehicle to rest his or her hands on a steering wheel thereof without affecting the torque envelope of the wheel angle controller whilst limiting the torque envelope as soon as the driver rapidly increases the magnitude of a steering wheel torque.

According to a second embodiment is provided that it further is arranged to receive a torsion bar torque related signal provided as an electrical power assisted steering assistance torque signal being a vehicle traveling velocity dependent amplification of a steering wheel torsion bar torque.

The provision of the steer torque manager being arranged to receive a vehicle traveling velocity dependent signal provides for efficiently adapting the driver in the loop functionality to the vehicle traveling velocity.

According to a third embodiment is provided that it further is arranged to filter the torsion bar torque related signal using as the one or more filters two lead filters connected in series and having a high frequency gain of one.

The provision of using as the one or more filters two lead filters, as above, provides for efficiently attenuating an amplitude of the torsion bar torque related signal at frequencies up to 2 Hz.

According to a fourth embodiment is provided that it further is arranged to blend the filtered torsion bar torque related signal with the unfiltered torsion bar torque related signal based on a driver in the loop factor being a measure of driver activity over a previous time window, and to modulate the overlay torque request to be provided by the wheel angle controller based on a measure of driver activity derived from the blended filtered torsion bar torque related signal, where more recent values are weighted higher than older values, using the time window of 0.5-3 seconds.

The provision of modulating the wheel angle controller based on a blended filtered torsion bar torque related signal provides for allowing higher sensitivity at frequencies up to 2 Hz once a driver has indicated an intention to actively steer an associated road vehicle.

According to a fifth embodiment is provided that it further is arranged to calculate the driver in the loop factor as a normalized version of a driver in the loop impulse which it is arranged to calculate as a measure of driver activity over a time window by multiplying the duration of the time window with the average torque over the time window such that the driver in the loop factor spans between indicating an inactive driver and a fully active driver.

The provision of calculating the driver in the loop factor as above provides an efficient way of providing a useful indication of driver steering activity.

According to a sixth embodiment is provided that the driver in the loop factor is arranged to span from 1 to 0 where 1 indicates an inactive driver and 0 indicates a fully active driver for whom the overlay torque request from an advanced driver assist functionality should be faded out and control handed over from an advanced driver assistance system to a driver.

The provision of arranging the driver in the loop factor to span from 1 to 0 as above provides an intuitive measure for indication of driver steering activity.

According to a seventh embodiment is provided that it is arranged to calculate the driver in the loop impulse, driver in the loop factor and torque limits for the wheel angle controller based on the blended filtered torsion bar torque related signal.

The provision of calculating the driver in the loop impulse as above provides for allowing higher sensitivity at low frequencies once a driver has indicated an intention to actively steer an associated road vehicle.

According to an eighth embodiment is provided that it is arranged to blend the filtered torsion bar torque related signal with the unfiltered torsion bar torque related signal in proportions between a signal essentially corresponding to the unfiltered torsion bar torque related signal for a low driver in the loop factor and essentially corresponding to the filtered torsion bar torque related signal for a high driver in the loop factor.

The provision of blending the filtered torsion bar torque related signal with the unfiltered torsion bar torque related signal in proportions as above provides for avoiding a risk of a pulsating phenomenon in the torsion bar torque which otherwise could be caused by a driver in the loop factor oscillating up and down.

According to a ninth embodiment is provided that the driver in the loop factor is rate limited.

The provision of rate limiting the driver in the loop factor provides for further avoiding uncomfortable jerks in the steering wheel of an associated road vehicle.

According to a tenth embodiment is provided a power steering control module that comprises a steer torque manager as above.

The provision of a power steering control module that comprises a steer torque manager as above provides for allowing a driver to rest his or her hands on the steering wheel without activating the driver in the loop functionality to hand over control of an associated road vehicle to a driver thereof whilst at the same time ensuring handover as soon as a driver rapidly increases the magnitude of a steering wheel torque.

According to an eleventh embodiment is provided an advanced driver assistance system that comprises a steer torque manager as above.

The provision of an advanced driver assistance system that comprises a steer torque manager as above provides for allowing a driver using the advanced driver assistance system to rest his or her hands on the steering wheel without activating the driver in the loop functionality to hand over control of an associated road vehicle to a driver thereof whilst at the same time ensuring handover as soon as a driver rapidly increases the magnitude of a steering wheel torque.

According to a twelfth embodiment is provided a road vehicle that comprises an advanced driver assistance system as above.

The provision of a road vehicle that comprises an advanced driver assistance system as above provides for an improved driver comfort when using an advanced driver assistance system, such as a pilot assist system.

According to a thirteenth embodiment is provided a method in a steer torque manager for an advanced driver assistance system of a road vehicle having an electrical power assisted steering, the steer torque manager comprising a driver in the loop functionality for determining when and how to hand over control from an advanced driver assistance system to a driver, a wheel angle controller for providing, from an advanced driver assistance system wheel angle request, an overlay torque request to be added to a torque request from the electrical power assisted steering, and the steer torque manager further being arranged to receive a steering wheel torsion bar torque related signal, where the method comprises controlling the driver in the loop functionality based on amplitude and frequency content of the torsion bar torque related signal through: filtering the torsion bar torque related signal to attenuate an amplitude thereof at frequencies up to 2 Hz; and modulating the overlay torque request to be provided by the wheel angle controller based on a measure of driver activity derived from the filtered torsion bar torque related signal, where more recent values are weighted higher than older values, using a time window of 0.5-3 seconds.

A method as above provides for allowing a driver of an associated road vehicle to rest his or her hands on a steering wheel thereof without affecting the torque envelope of the wheel angle controller whilst limiting the torque envelope as soon as the driver rapidly increases the magnitude of a steering wheel torque.

BRIEF DESCRIPTION OF THE DRAWINGS

In the following, embodiments herein will be described in greater detail by way of example only with reference to attached drawings.

Figure 1:
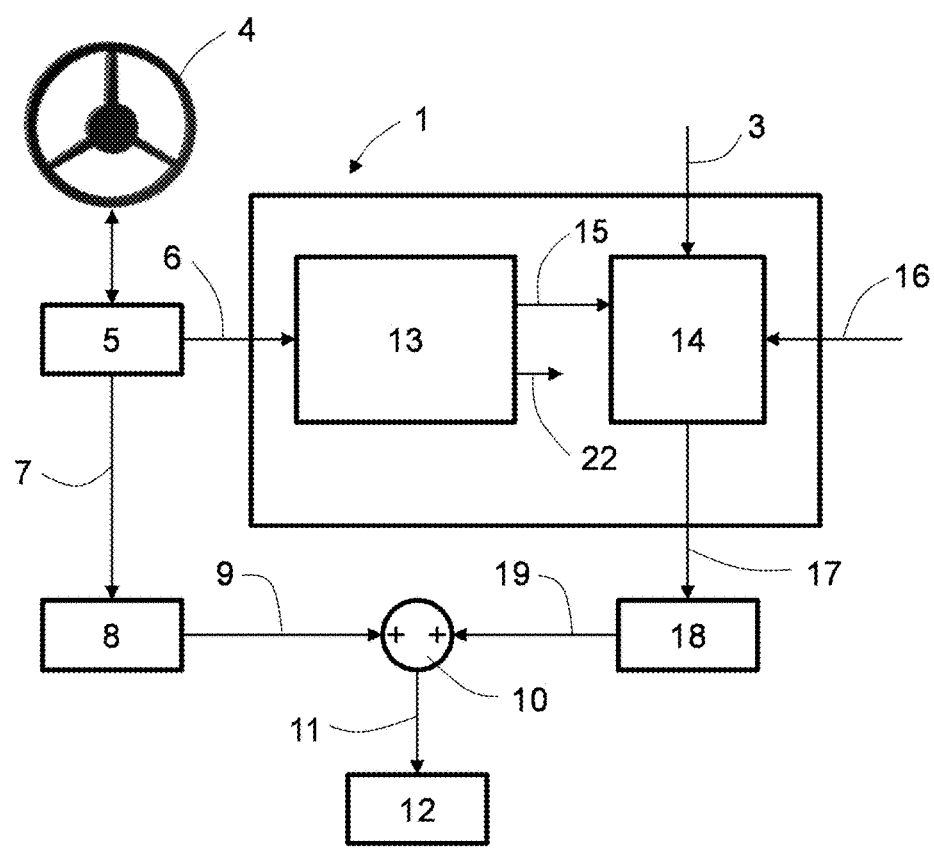
FIG. 1 is a schematic illustration of a steer torque manager for an advanced driver assistance system arranged in an electrical power assisted steering system of a road vehicle.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

This disclosure is based on the realization that is should be possible to provide an improved steer torque manager 1 for an advanced driver assistance system 26 of a road vehicle 2, which is able to track a wheel angle request 3 from an advanced driver assistance system path while suppressing a torque disturbance from a driver that rests his hands on a steering wheel 4 of the road vehicle 2.

Further that this should be possible whilst ensuring that, when a driver desires to take control of the road vehicle 2, control is comfortably handed over to the driver such that the driver never experiences high torque in the steering wheel 4.

This is, as illustrated in FIG. 1, provided through a steer torque manager 1, as described in the following, for an advanced driver assistance system 26 of a road vehicle 2 having an electrical power assisted steering (EPAS).

FIG. 1 illustrates schematically such a steer torque manager 1, where a steering wheel 4 torque applied by a driver of the road vehicle 2, and sensed by a steering wheel torque sensor 29, is used by an electrical power assisted steering (EPAS) assistance functionality 5 arranged to provide a steering wheel 4 torsion bar 28 torque related signal 6, representative of an assistance torque or basic steering torque (BST), and an assistance torque request 7. This assistance torque request 7 is normally identified as a QM hazard which does not dictate any safety requirements according to the Automotive Safety Integrity Level (ASIL) risk classification scheme defined by the ISO 26262—Functional Safety for Road Vehicles standard.

The assistance torque request 7 is subject to an assistance torque safety limiter 8 which in turn provide a safety limited assistance torque request 9 that fulfil Automotive Safety Integrity Level D, which is the highest classification of initial hazard (injury risk) defined within ISO 26262 and to that standard's most stringent level of safety measures to apply for avoiding an unreasonable residual risk.

This ASIL D compliant safety limited assistance torque request 9 is then brought to a summation point 10, which in turn provides a total torque request 11 to a motor controller 12 of a steering system 30 of the road vehicle 2.

Figure 2:
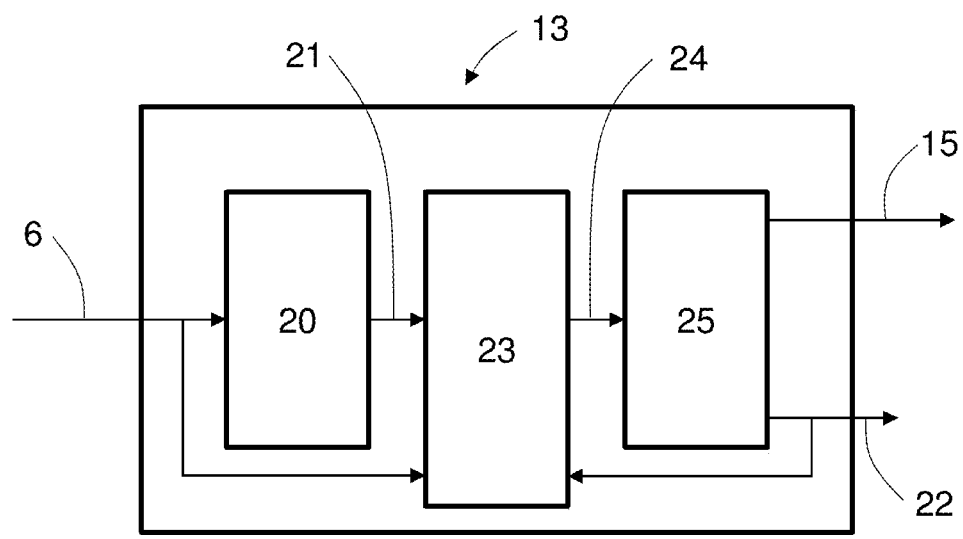
FIG. 2 is a schematic illustration in more detail of a driver in the loop functionality of the steer torque manager of FIG. 1.

The steer torque manager 1 comprises a driver in the loop functionality 13, as illustrated in more detail in FIG. 2, to which driver in the loop functionality 13 the steering wheel 4 torsion bar 28 torque related signal 6, sometimes also referred to as basic steering torque (BST) signal, is provided. The driver in the loop functionality 13 uses this steering wheel 4 torsion bar 28 torque related signal 6 for determining when and how to hand over control from an advanced driver assistance system 26 to a driver.

The steer torque manager 1 also comprises a wheel angle controller 14 for providing, based on or from an advanced driver assistance system 26 wheel angle request 3 and torque limits 15, upper and lower, from the driver in the loop functionality 13, and usually also from wheel angle and wheel angle rate data 16, an overlay torque request 17.

This overlay torque request 17 is also identified as a QM hazard which does not dictate any safety requirements, why it is also subject to an overlay torque safety limiter 18 which in turn provide a safety limited overlay torque request 19 that fulfil Automotive Safety Integrity Level D.

The safety limited overlay torque request 19 is then arranged to be added to the ASIL D compliant safety limited assistance torque request 9 from the electrical power assisted steering 5 at the summation point 10, which in turn provides a total torque request 11 to the motor controller 12 of the steering system 30 of the road vehicle 2.

The steer torque manager 1 is further arranged to receive the steering wheel 4 torsion bar 28 torque related signal 6, and further arranged to control the driver in the loop functionality 13 based on amplitude and frequency content of the torsion bar 28 torque related signal 6. This is done through the steer torque manager 1 being arranged to filter the torsion bar 28 torque related signal 6 using one or more filters 20 to attenuate an amplitude of the filtered torsion bar 28 torque related signal 21 at frequencies up to 2 Hz, depending on tuning up to 1-2 Hz, and to modulate the overlay torque request 17 to be provided by the wheel angle controller 14 based on a measure of driver activity 22, also referred to as driver in the loop factor, derived from the filtered torsion bar 28 torque related signal 21, where more recent values are weighted higher than older values, using a time window of 0.5-3 seconds.

Thus, through modulating the overlay torque request 17, as described above, it is possible to provide for allowing a driver of an associated road vehicle 2 to rest his or her hands on a steering wheel 4 thereof, without affecting the torque envelope of the wheel angle controller 14 whilst limiting the torque envelope as soon as the driver rapidly increases or decreases the magnitude of a steering wheel 4 torque.

According to embodiments hereof the steer torque manager 1 is further arranged to receive a torsion bar 28 torque related signal 6 provided as an electrical power assisted steering assistance torque signal being a road vehicle 2 traveling velocity dependent amplification of a steering wheel 4 torsion bar 28 torque. This provides for efficiently adapting the driver in the loop functionality 13 to the road vehicle 2 traveling velocity.

In some embodiments, the steer torque manager 1 is further arranged to filter the torsion bar 28 torque related signal using as the one or more filters 20, two lead filters connected in series and having a high frequency gain of one, which provides for efficiently attenuating an amplitude of the torsion bar 28 torque related signal 6 at frequencies up to 2 Hz.

In yet further embodiments the steer torque manager 1 is further arranged to blend, using a blending functionality 23, the filtered torsion bar 28 torque related signal 21 with the unfiltered torsion bar 28 torque related signal 6 based on a driver in the loop factor 22 to provide a blended filtered torsion bar 28 torque related signal 24. The driver in the loop factor 22 is a measure of driver activity over a previous time window. The steer torque manager 1 is further arranged to modulate the overlay torque request 17 to be provided by the wheel angle controller 14 based on a measure of driver activity 22 derived from the blended filtered torsion bar 28 torque related signal 24, where more recent values are weighted higher than older values, using a time window of 0.5-3 seconds. Modulating the wheel angle controller based on a blended filtered torsion bar 28 torque related signal 24 in this way provides for allowing higher sensitivity at frequencies up to 2 Hz once a driver has indicated an intention to actively steer the associated road vehicle.

According to still some embodiments the steer torque manager 1 is further arranged to calculate, using a calculating functionality 25, the driver in the loop factor 22 as a normalized version of a driver in the loop impulse. The steer torque manager 1 is arranged to calculate the driver in the loop impulse as a measure of driver activity over a time window by multiplying the duration of the time window with the average torque over the time window, such that the driver in the loop factor 22 spans between indicating an inactive driver and a fully active driver. This is an efficient way of providing a useful indication of driver steering activity.

In some such embodiments, the driver in the loop factor 22 is arranged to span from 1 to 0 where 1 indicates an inactive driver and 0 indicates a fully active driver, for whom the overlay torque request 17 generated from an advanced driver assist functionality 26 wheel angle request 3 should be faded out and control handed over from an advanced driver assistance system 26 to a driver. Having the driver in the loop factor 22 to span from 1 to 0 as described above provides an intuitive and useful measure for indication of driver steering activity.

In yet some embodiments, the steer torque manager 1 is arranged to calculate the driver in the loop impulse, driver in the loop factor 22 and torque limits 15 for the wheel angle controller 14 based on the blended filtered torsion bar 28 torque related signal 24. Hereby higher sensitivity at low frequencies will be allowed once a driver has indicated an intention to actively steer an associated road vehicle 2.

In still further embodiments, the steer torque manager 1 is arranged to blend, using the blending functionality 23, the filtered torsion bar 28 torque related signal 24 with the unfiltered torsion bar 28 torque related signal 6 in proportions between a signal essentially corresponding to the unfiltered torsion bar 28 torque related signal 6 for a low driver in the loop factor 22 and essentially corresponding to the filtered torsion bar 28 torque related signal 21 for a high driver in the loop factor 22. Blending the filtered torsion bar 28 torque related signal 21 with the unfiltered torsion bar 28 torque related signal 6 in proportions as described above provides for avoiding a risk of a pulsating phenomenon in the torsion bar 28 torque. Such a pulsating phenomenon in the torsion bar 28 torque could otherwise be caused by a driver in the loop factor 22 oscillating up and down.

In yet some the driver in the loop factor 22 is rate limited, which provides for further avoiding uncomfortable jerks in the steering wheel 4 of the associated road vehicle 2.

Thus, as described above, through feeding a filtered (frequency-weighted) version 21 of the torsion bar 28 torque through the driver in the loop functionality 13, with calculation using a calculating functionality 25 of the accumulated driver in the loop impulse, driver in the loop factor 22 and torque limits 15 for the wheel angle controller 14 based on the blended filtered torsion bar 28 torque related signal 24, as illustrated in FIG. 2, and having a blending functionality 23 which is dependent on a feedback of the driver in the loop factor 22, such that when the driver in the loop factor 22 is close to one it will provide higher gain at high frequencies compared to low frequencies but as the driver in the loop factor 22 decreases it will tend towards equal gain at all frequencies, it is possible to provide an improved steer torque manager 1 for an advanced driver assistance system 26 of a road vehicle 2, which is able to track a wheel angle request 3 from an advanced driver assistance system path while suppressing a torque disturbance from a driver that rests his hands on a steering wheel 4 of the road vehicle 2, whilst facilitating fulfillment of high Automotive Safety Integrity requirements.

Figure 4:
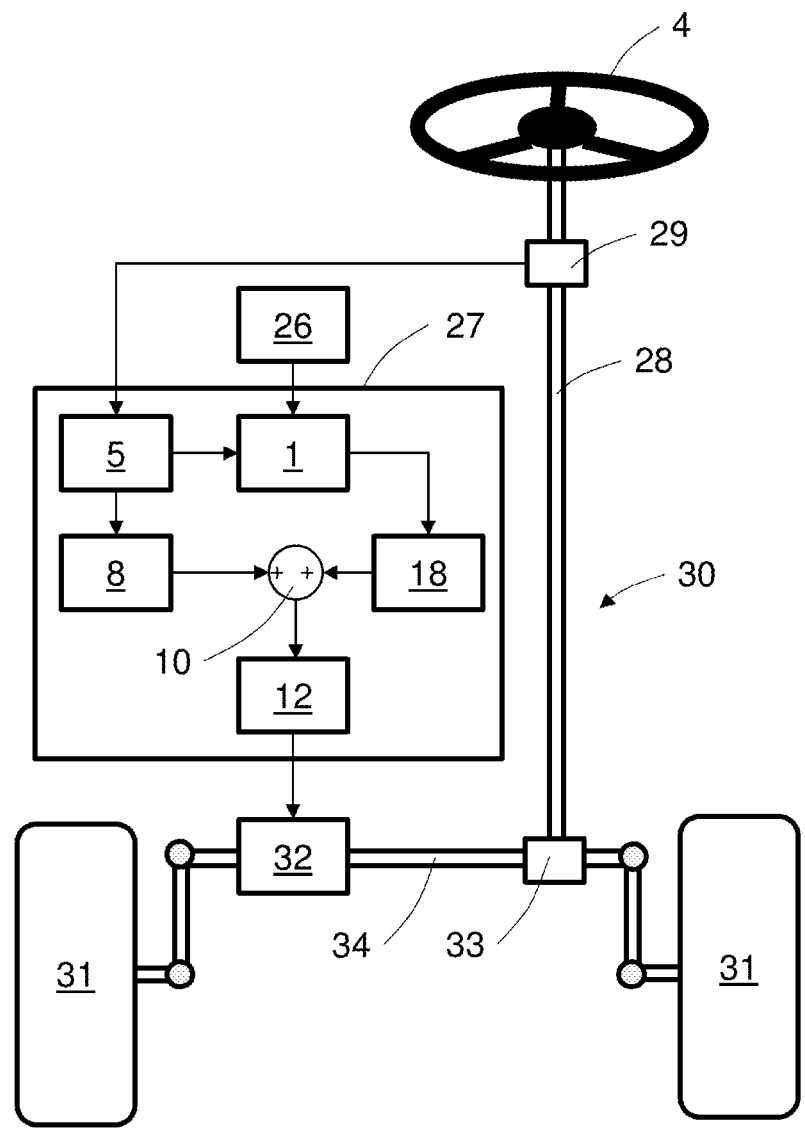
FIG. 4 is a schematic illustration of a power steering control module that comprises a steer torque manager according to embodiments herein.

As illustrated schematically in FIG. 4, it is further envisaged herein a power steering control module 27 that comprises a steer torque manager 1 as above. The steering system 30 of the vehicle 2 comprises a steering wheel 4, connected to a steering rack 34 via a torsion bar 28, to which a steering wheel torque sensor 29 is arranged, and a pinion gear 33. The power steering control module 27 comprises the steer torque manager 1, which is arranged to control the overlay torque motor 32 of the steering system 30 of the road vehicle 2 to provide an overlay torque to steerable wheels 31 of the vehicle 1 steering system 30.

A power steering control module 27 that comprises a steer torque manager 1 as above provides for allowing a driver to rest his or her hands on the steering wheel 4 without activating the driver in the loop functionality 13 to hand over control of an associated road vehicle 2 to a driver thereof, whilst at the same time ensuring handover as soon as a driver rapidly increases the magnitude of a steering wheel 4 torque.

Figure 5:
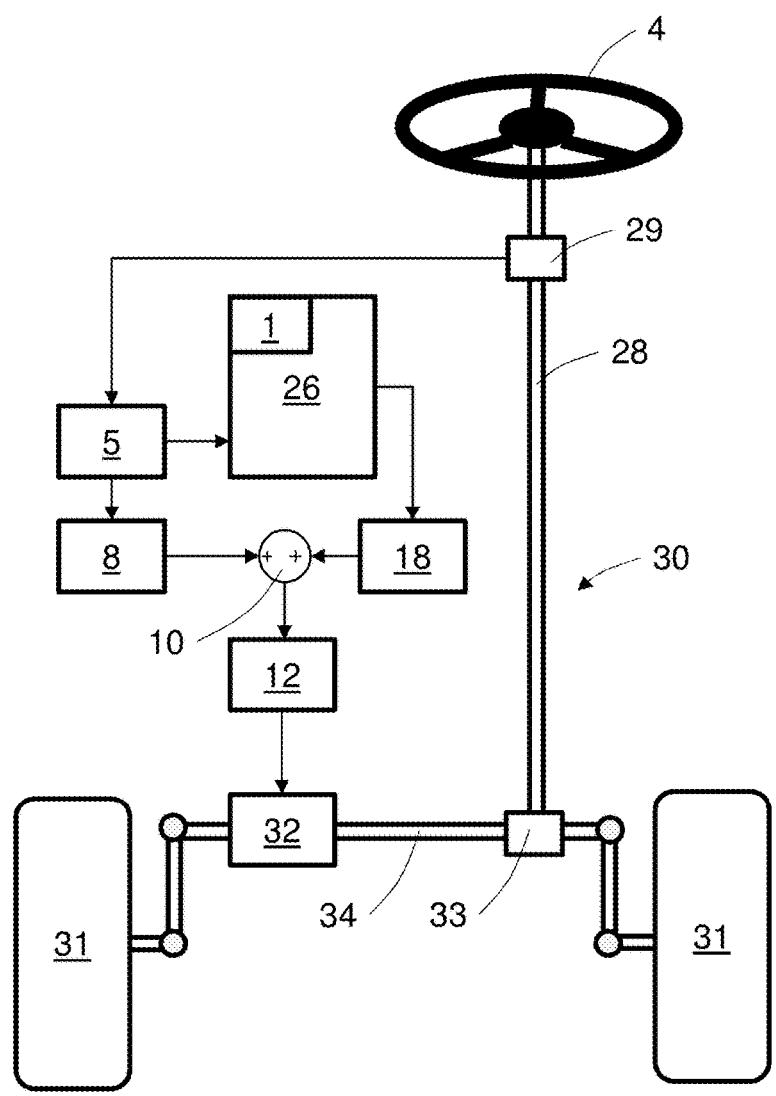
FIG. 5 is a schematic illustration of an advanced driver assistance system that comprises a steer torque manager according to embodiments herein.

It is still further envisaged herein, as illustrated schematically in FIG. 5, an advanced driver assistance system 26 that comprises a steer torque manager 1 as above. As for FIG. 4, the steering system 30 of the vehicle 2 comprises a steering wheel 4, connected to a steering rack 34 via a torsion bar 28, to which a steering wheel torque sensor 29 is arranged, and a pinion gear 33.

An advanced driver assistance system 26 that comprises a steer torque manager 1 as described above provides for allowing a driver, using the advanced driver assistance system 26, to rest his or her hands on the steering wheel 4 without activating the driver in the loop functionality 13 to hand over control of an associated road vehicle 2 to a driver thereof, whilst at the same time ensuring handover as soon as a driver rapidly increases the magnitude of a steering wheel 4 torque.

Figure 3:
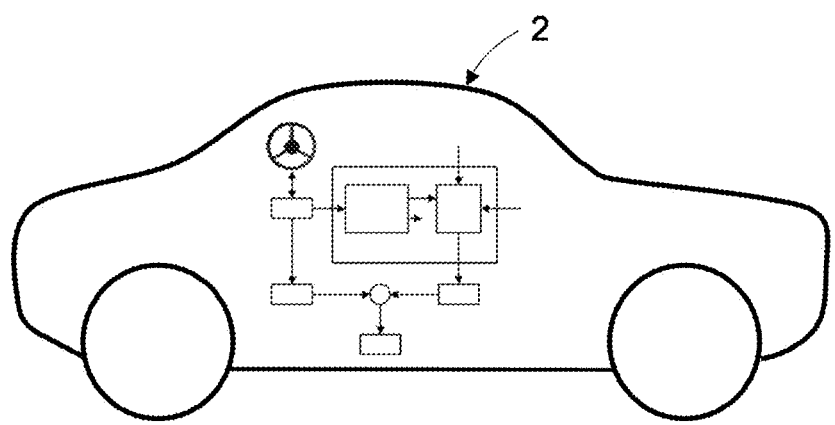
FIG. 3 is a schematic illustration of a road vehicle comprising the steer torque manager of FIG. 1 arranged in an electrical power assisted steering system thereof.

Still further envisaged herein is a road vehicle 2, as illustrated in FIG. 3, which comprises an advanced driver assistance system as above. A road vehicle 2 that comprises an advanced driver assistance system as above provides for an improved driver comfort when using an advanced driver assistance system 26, such as a pilot assist system.

Figure 6:
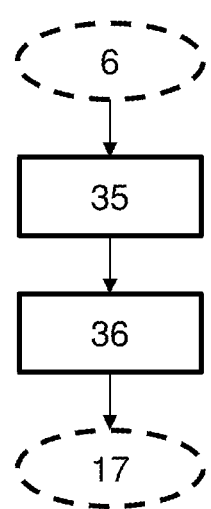
FIG. 6 is a schematic illustration of a method in a steer torque manager according to embodiments herein.

In accordance with the present application is also envisaged a method in a steer torque manager 1 for an advanced driver assistance system 26 of a road vehicle 2 having an electrical power assisted steering, as schematically illustrated in FIG. 6. The steer torque manager 1 comprises a driver in the loop functionality 13 for determining when and how to hand over control from an advanced driver assistance system 26 to a driver of the road vehicle 2. The steer torque manager 1 further comprises a wheel angle controller 14 for providing, based on or from an advanced driver assistance system 26 wheel angle request 3, an overlay torque request 17 to be added to a torque request 7 from the electrical power assisted steering. The steer torque manager 1 is further arranged to receive a steering wheel 4 torsion bar 28 torque related signal 6.

The method comprises controlling the driver in the loop functionality 13 based on amplitude and frequency content of the torsion bar 28 torque related signal 6 through:

35—filtering the torsion bar 28 torque related signal 6, illustrated as the dashed starting point in FIG. 6, to attenuate an amplitude thereof at frequencies up to 2 Hz; and

36—modulating the overlay torque request 17 to be provided by the wheel angle controller 14 based on a measure of driver activity 22 derived from the filtered torsion bar 28 torque related signal 21, where more recent values are weighted higher than older values, using a time window of 0.5-3 seconds. The modulated overlay torque request 17 is illustrated as the dashed finishing point in FIG. 6.

The above method provides for allowing a driver of an associated road vehicle 2 to rest his or her hands on a steering wheel 4 thereof without affecting the torque envelope of the wheel angle controller 14 whilst limiting the torque envelope as soon as the driver rapidly increases or decreases the magnitude of a steering wheel 4 torque.

It should be noted that the steering torque manager 1, the advanced driver assistance system 26, the electrical power assisted steering functionality 5, assistance torque safety limiter 8, the motor controller 12, the steering system 30, the driver in the loop functionality 13, the wheel angle controller 14, torque safety limiter 18, the one or more filters 20, the blending functionality 23, the calculating functionality 25, the power steering control module 27, the wheel torque sensor 29, the overlay torque motor 32, as well as any other device, unit, feature, manager, system, functionality, limiter, sensor, motor, controller, filter, module, arrangement, or the like described herein may comprise and/or be implemented in or by one or more appropriately programmed processors (e.g., one or more microprocessors including central processing units (CPU)) and associated memory and/or storage, which may include data, operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A steer torque manager for an advanced driver assistance system of a road vehicle having an electrical power assisted steering functionality, the steer torque manager comprising:

a driver-in-the-loop functionality for determining when and how to hand over control from the advanced driver assistance system to a driver; and a wheel angle controller for providing, from an advanced driver assistance system wheel angle request, an overlay torque request to be added to a torque request from the electrical power assisted steering functionality;

wherein the steer torque manager is configured to receive a steering wheel torsion bar torque related signal and to control the driver-in-the-loop functionality based on amplitude and frequency content of the torsion bar torque related signal through filtering the torsion bar torque related signal to attenuate an amplitude thereof at frequencies up to 2 Hz and modulating the overlay torque request to be provided by the wheel angle controller based on a plurality of measures of driver activity derived from the filtered torsion bar torque related signal using a time window of 0.5-3 seconds, where a more recent value of driver activity is weighted higher than an older value of driver activity.

2. The steer torque manager of claim 1 further configured to receive a torsion bar torque related signal provided as an electrical power assisted steering assistance torque signal comprising a vehicle traveling velocity dependent amplification of a steering wheel torsion bar torque.

3. The steer torque manager of claim 1 further configured to filter the torsion bar torque related signal using two lead filters connected in series and having a high frequency gain of one.

4. The steer torque manager of claim 1 further configured to blend the filtered torsion bar torque related signal with the unfiltered torsion bar torque related signal based on a driver-in-the-loop factor being a measure of driver activity over a previous time window, and to modulate the overlay torque request to be provided by the wheel angle controller based on a measure of driver activity derived from the blended filtered torsion bar torque related signal, where more recent values are weighted higher than older values, using the time window of 0.5-3 seconds.

5. The steer torque manager according to claim 4 further configured to calculate the driver-in-the-loop factor as a normalized version of a driver-in-the-loop impulse which the steer torque manager is configured to calculate as a measure of driver activity over a time window by multiplying the duration of the time window with the average torque over the time window such that the driver-in-the-loop factor spans between indicating an inactive driver and a fully active driver.

6. The steer torque manager according to claim 4 wherein the driver-in-the-loop factor is arranged to span from 1 to 0, where 1 indicates an inactive driver and 0 indicates a fully active driver for whom the overlay torque request from an advanced driver assist functionality should be faded out and control handed over from an advanced driver assistance system to a driver.

7. The steer torque manager of claim 5 further configured to calculate the driver-in-the-loop impulse, driver-in-the-loop factor, and torque limits for the wheel angle controller based on the blended filtered torsion bar torque related signal.

8. The steer torque manager of claim 6 further configured to blend the filtered torsion bar torque related signal with the unfiltered torsion bar torque related signal in proportions between a signal essentially corresponding to the unfiltered torsion bar torque related signal for a low driver-in-the-loop factor and essentially corresponding to the filtered torsion bar torque related signal for a high driver-in-the-loop factor.

9. The steer torque manager of claim 7 wherein the driver-in-the-loop factor is rate limited.

10. A power steering control module comprising a steer torque manager according to claim 1.

11. An advanced driver assistance system comprising a steer torque manager according to claim 1.

12. A road vehicle comprising an advanced driver assistance system according to claim 11.

13. A method performed by a steer torque manager for an advanced driver assistance system of a road vehicle having an electrical power assisted steering functionality, the steer torque manager comprising a driver-in-the-loop functionality for determining when and how to hand over control from the advanced driver assistance system to a driver, a wheel angle controller for providing, from an advanced driver assistance system wheel angle request, an overlay torque request to be added to a torque request from the electrical power assisted steering functionality, the steer torque manager configured to receive a steering wheel torsion bar torque related signal, the method comprising:

controlling the driver-in-the-loop functionality based on amplitude and frequency content of the torsion bar torque related signal;

wherein controlling the driver-in-the-loop functionality comprises, filtering the torsion bar torque related signal to attenuate an amplitude thereof at frequencies up to 2 Hz, and modulating the overlay torque request to be provided by the wheel angle controller based on a plurality of measures of driver activity derived from the filtered torsion bar torque related signal using a time window of 0.5-3 seconds, where a more recent value of driver activity is weighted higher than an older value of driver activity.

14. A steer torque manager for an advanced driver assistance system of a road vehicle having an electrical power assisted steering functionality, the steer torque manager comprising:

a driver-in-the-loop functionality for determining when and how to hand over control from the advanced driver assistance system to a driver; and a wheel angle controller for providing, from an advanced driver assistance system wheel angle request, an overlay torque request to be added to a torque request from the electrical power assisted steering functionality;

wherein the steer torque manager is configured to receive a steering wheel torsion bar torque related signal and to control the driver-in-the-loop functionality based on amplitude and frequency content of the torsion bar torque related signal through filtering the torsion bar torque related signal to attenuate an amplitude thereof at frequencies up to 2 Hz and modulating the overlay torque request to be provided by the wheel angle controller based on a measure of driver activity derived from the filtered torsion bar torque related signal, where more recent values are weighted higher than older values, using a time window of 0.5-3 seconds.

15. The steer torque manager of claim 14 further configured to receive a torsion bar torque related signal provided as an electrical power assisted steering assistance torque signal comprising a vehicle traveling velocity dependent amplification of a steering wheel torsion bar torque.

16. The steer torque manager of claim 14 further configured to filter the torsion bar torque related signal using two lead filters connected in series and having a high frequency gain of one.

17. The steer torque manager of claim 14 further configured to blend the filtered torsion bar torque related signal with the unfiltered torsion bar torque related signal based on a driver-in-the-loop factor being a measure of driver activity over a previous time window, and to modulate the overlay torque request to be provided by the wheel angle controller based on a measure of driver activity derived from the blended filtered torsion bar torque related signal, where more recent values are weighted higher than older values, using the time window of 0.5-3 seconds.

18. The steer torque manager according to claim 17 further configured to calculate the driver-in-the-loop factor as a normalized version of a driver-in-the-loop impulse which the steer torque manager is configured to calculate as a measure of driver activity over a time window by multiplying the duration of the time window with the average torque over the time window such that the driver-in-the-loop factor spans between indicating an inactive driver and a fully active driver.

19. The steer torque manager according to claim 17 wherein the driver-in-the-loop factor is arranged to span from 1 to 0, where 1 indicates an inactive driver and 0 indicates a fully active driver for whom the overlay torque request from an advanced driver assist functionality should be faded out and control handed over from an advanced driver assistance system to a driver.

20. The steer torque manager of claim 18 further configured to calculate the driver-in-the-loop impulse, driver-in-the-loop factor, and torque limits for the wheel angle controller based on the blended filtered torsion bar torque related signal.

* * * * *